(12) United States Patent
Finklea et al.

(10) Patent No.: US 12,139,257 B2
(45) Date of Patent: *Nov. 12, 2024

(54) AIR-LAUNCHED UNMANNED AERIAL VEHICLE

(71) Applicant: Sierra Nevada Corporation, Sparks, NV (US)

(72) Inventors: Ken Finklea, Madison, AL (US); Carlos Miralles, Burbank, CA (US); Guan Hua Su, Monterey Park, CA (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,753

(22) Filed: Mar. 11, 2021

(65) Prior Publication Data

US 2021/0371081 A1    Dec. 2, 2021

Related U.S. Application Data

(62) Division of application No. 15/608,758, filed on May 30, 2017, now Pat. No. 10,974,809.

(Continued)

(51) Int. Cl.
*B64C 3/56* (2006.01)
*B64D 17/80* (2006.01)
(Continued)

(52) U.S. Cl.
CPC .............. *B64D 17/80* (2013.01); *B64U 30/12* (2023.01); *B64U 70/50* (2023.01); *B64U 50/13* (2023.01);
(Continued)

(58) Field of Classification Search
CPC ... B64C 3/56; B64C 39/024; B64C 2201/084; B64C 2201/021; B64C 2201/08;
(Continued)

(56) References Cited

U.S. PATENT DOCUMENTS 1,376,785 A * 5/1921 Sellmer ..................... B64C 3/56
                                                                244/49
2,166,564 A * 7/1939 Pavlecka ................... B64C 3/56
                                                                244/49

(Continued)

FOREIGN PATENT DOCUMENTS

WO    2017/134459 A1    8/2017

OTHER PUBLICATIONS

Information about Related Patents, Patent Applications, and Patent Office Proceedings see the section below having the same title.

(Continued)

*Primary Examiner* — Christopher D Hutchens
(74) *Attorney, Agent, or Firm* — HOLLAND & HART LLP

(57) ABSTRACT

Various embodiments are described of an unmanned aerial vehicle having a wing. The unmanned aerial vehicle includes a first body of the wing with a first end proximate a body of the vehicle. A second end is opposite the first end. A first joint is on the first end of the first main body of the wing. The joint rotatably couples the wing to the vehicle. A second joint is on the second end of the vehicle. A second body of the wing is rotatably coupled to the first body via the second joint.

19 Claims, 15 Drawing Sheets

Related U.S. Application Data

(60) Provisional application No. 62/353,948, filed on Jun. 23, 2016.

(51) Int. Cl.
*B64U 30/12* (2023.01)
*B64U 70/50* (2023.01)
*B64U 50/13* (2023.01)
*B64U 50/19* (2023.01)
*B64U 80/70* (2023.01)
*B64U 80/86* (2023.01)

(52) U.S. Cl.
CPC .............. *B64U 50/19* (2023.01); *B64U 80/70* (2023.01); *B64U 80/86* (2023.01); *B64U 2201/20* (2023.01)

(58) Field of Classification Search
CPC ........ B64C 2201/102; B64C 2201/201; B64C 2201/208; B64C 3/40; B64D 17/80; B64U 30/12; B64U 70/80
See application file for complete search history.

(56) References Cited

U.S. PATENT DOCUMENTS

| | | | |
|---|---|---|---|
| 2,700,632 A | 1/1955 | Ackerlind | |
| 4,304,376 A | 12/1981 | Hilton | |
| 5,118,052 A * | 6/1992 | Alvarez Calderon F | B64C 39/024 89/1.801 |
| 5,192,037 A * | 3/1993 | Moorefield | B64C 3/56 244/3.28 |
| 5,379,969 A * | 1/1995 | Marx | B64C 3/56 244/49 |
| 5,437,936 A | 8/1995 | Johnson | |
| 5,460,865 A | 10/1995 | Tsotsis | |
| 6,260,797 B1 * | 7/2001 | Palmer | B64D 17/80 102/501 |
| 9,452,820 B1 * | 9/2016 | Wirth | B64C 3/16 |
| 9,527,596 B1 * | 12/2016 | Adams | B64C 39/024 |
| 9,783,284 B2 * | 10/2017 | Townsend | B64C 3/56 |
| 10,124,880 B1 * | 11/2018 | Ellzey | B64C 9/02 |
| 10,974,809 B2 * | 4/2021 | Finklea | B64C 3/56 |
| 2001/0031350 A1 | 10/2001 | Day et al. | |
| 2003/0089820 A1 * | 5/2003 | Martorana | F42B 15/105 244/3.1 |
| 2005/0116116 A1 | 6/2005 | Morgenstern | |
| 2005/0274845 A1 * | 12/2005 | Miller | B64F 1/06 244/49 |
| 2007/0262207 A1 | 11/2007 | Morgenstern et al. | |
| 2009/0202780 A1 | 8/2009 | Loszewski et al. | |
| 2009/0302151 A1 * | 12/2009 | Holmes | B64C 3/56 244/49 |
| 2010/0264260 A1 * | 10/2010 | Hammerquist | B64C 3/56 244/49 |
| 2015/0008280 A1 * | 1/2015 | Smoker | B63G 8/38 244/63 |
| 2015/0266578 A1 * | 9/2015 | Elkins | B64C 39/024 244/137.1 |
| 2017/0355441 A1 * | 12/2017 | Winkelmann | B64C 3/56 |
| 2017/0369150 A1 * | 12/2017 | Finklea | B64U 80/82 |

OTHER PUBLICATIONS

Information Submitted in Parent Patent Applications, see MPEP 609.02 and the section below having the same title.
US-2017/036150 U.S. Appl. No. 15/608,758, filed Dec. 28, 2017, Air-Launched Unmanned Aerial Vehicle.

* cited by examiner

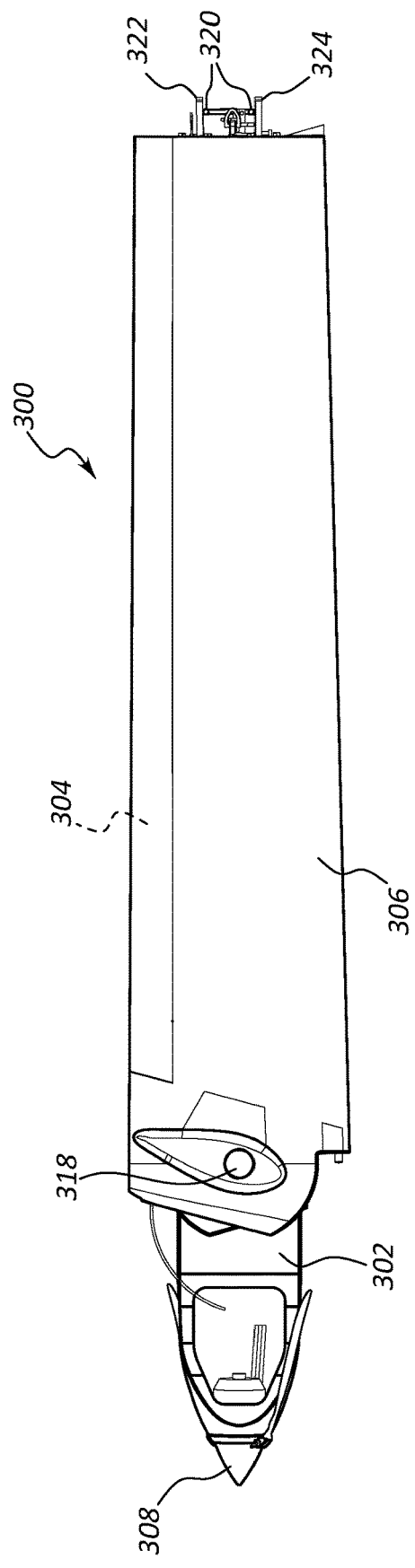
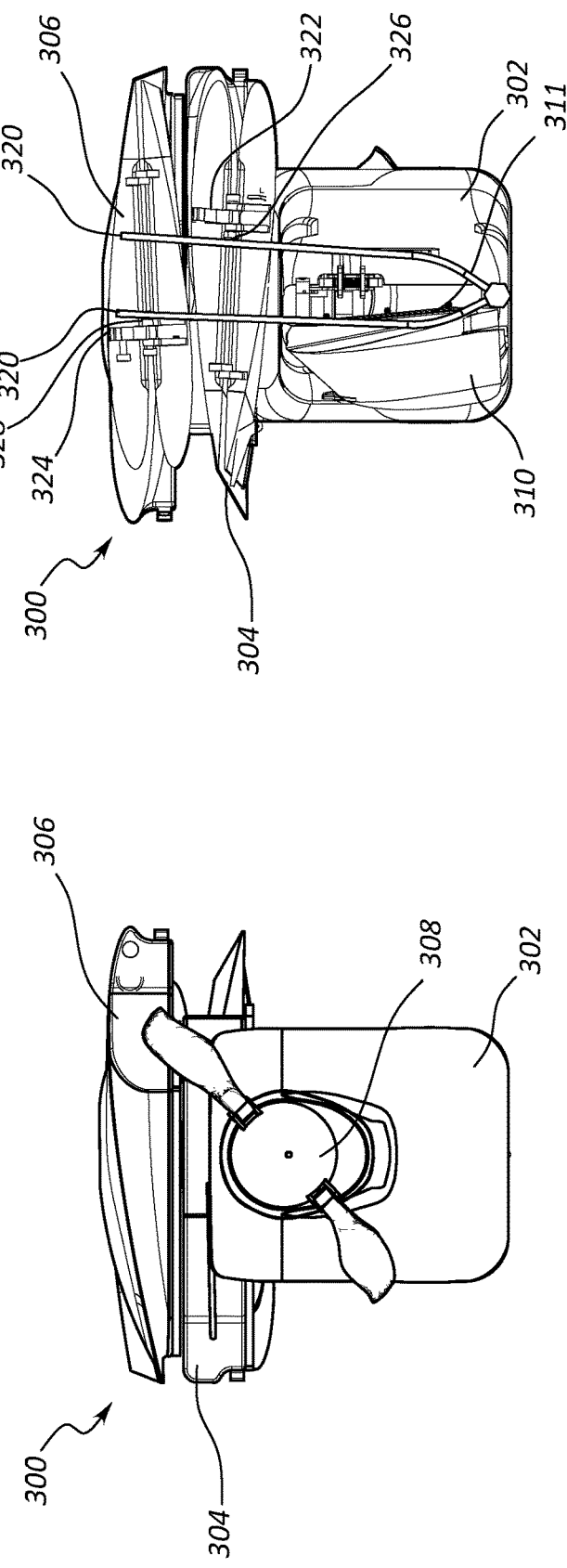
FIG. 3B
FIG. 3D
FIG. 3C

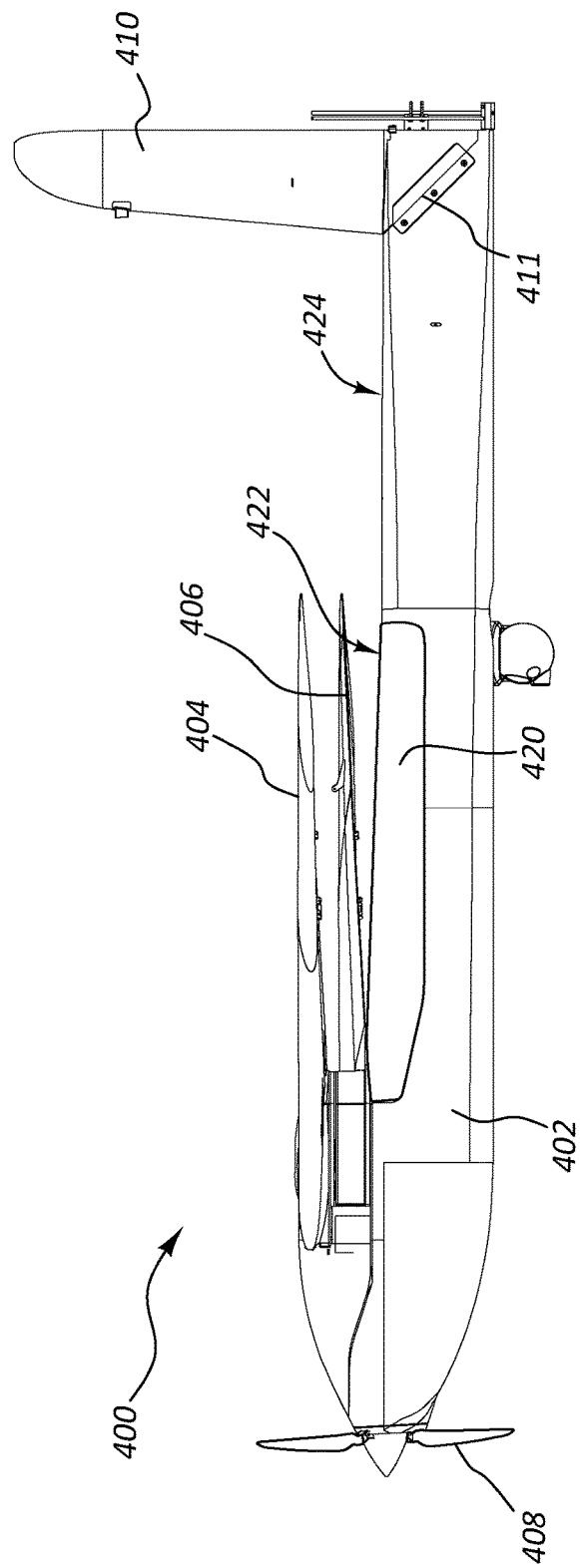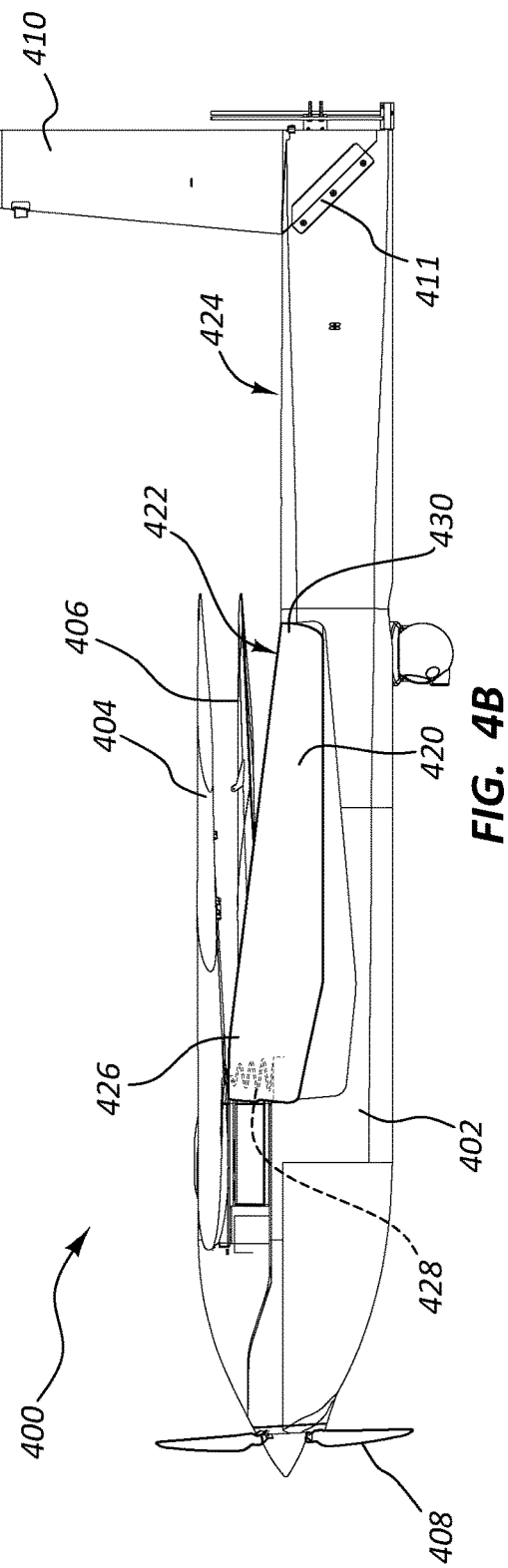

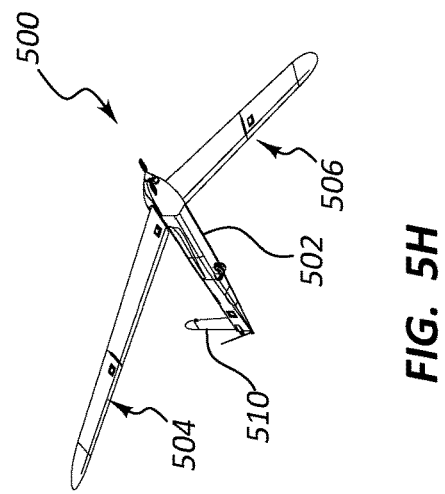
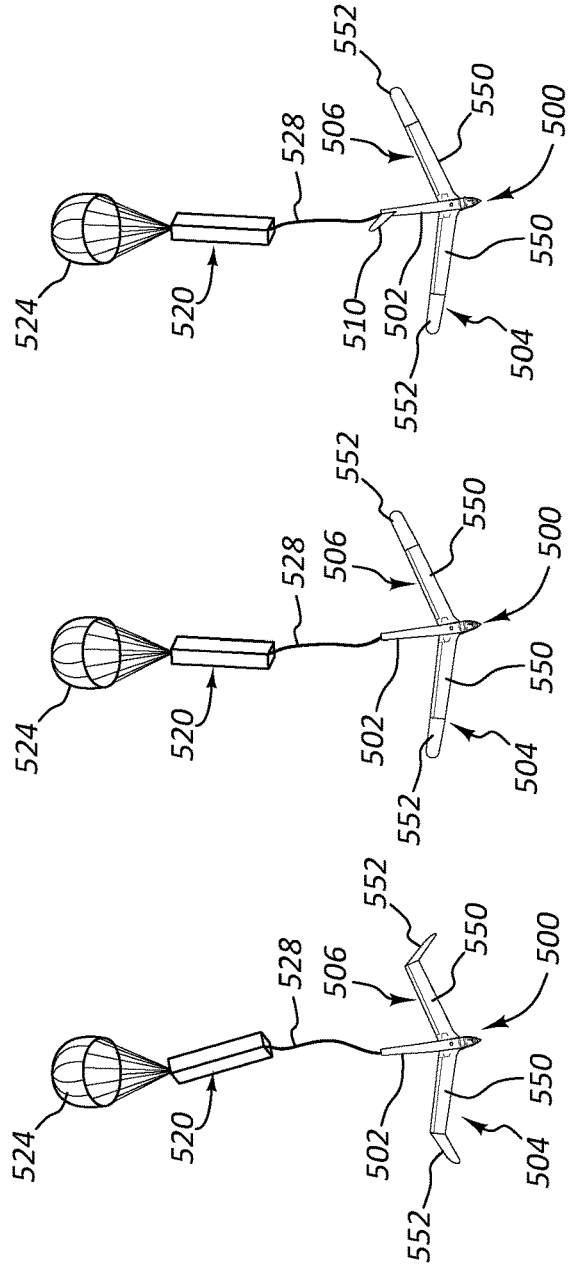
FIG. 5H
FIG. 5G
FIG. 5F
FIG. 5E

AIR-LAUNCHED UNMANNED AERIAL VEHICLE

TECHNICAL FIELD

The present disclosure relates generally to aerial vehicles, and more particularly to air-launched unmanned aerial vehicles.

BACKGROUND

Unmanned aerial vehicles are aircraft capable of flight without a human pilot aboard. Unmanned aerial vehicles are also referred to as UAVs, drones, or unmanned aircraft systems (UAS). UAVs may be driven remotely by a human operator or may be autonomously driven by computers onboard the system. UAVs may be used in military settings to provide surveillance and information back to a base station, an advance team, or others. The UAV may provide information that is deemed too dangerous or monotonous for human presence. UAVs may also be used by civilians for recreational use and other purposes.

SUMMARY

One aspect of the present disclosure relates to a wing for an unmanned aerial vehicle. The wing includes a first and second main bodies, and first and second joints. The first main body has a first end configured to be positioned adjacent to a body of the vehicle, and a second end opposite the first end. The first joint is positioned at the first end of the first main body and rotatably couples the wing to the body of the vehicle. The second joint is positioned at the second end of the first main body. The second main body is rotatably coupled to the first main body via the second joint.

The first joint may include a pin joint and the second joint may include a hinge joint. The hinge joint may include a lever arm, a fulcrum positioned on the first main body about which the lever arm pivots, and a pivot joint connecting the lever arm to the second main body. The hinge joint may further include a tension element connected to the lever arm and positioned to exert an unfolding moment force to the second body. The wing may also include a locking mechanism, which is operable to lock the first main body and the second main body in an operable condition. The locking mechanism may include a groove formed in a first wing spar, and a latch member formed in a second wing spar. The second joint may be canted at an angle to the body of the vehicle. The first end of the first main body may be pivotally coupled to a top side of the body of the vehicle. A bottom side of the first main body of the wing may face a bottom side of the second main body of the wing when the wing is in a collapsed position.

Another aspect of the present disclosure relates to a method of deploying an unmanned aerial vehicle (UAV). The method includes providing the unmanned aerial vehicle with a fuselage and at least a first wing, the first wing including first and second wing spars, rotating the first wing away from the fuselage, rotating the second wing spar away from the first wing spar, and locking the first wing spar and the second wing spar in an operable position.

The method may also include providing a canister, inserting the UAV in the canister prior to rotating the first wing, and deploying the UAV from the canister prior to rotating the first wing. The method may include putting the canister with inserted UAV in a free fall state, and then slowing the descent of the canister with inserted UAV. Slowing the descent may include deploying a drogue chute attached to an aft-end of the canister. The method may include putting the canister with inserted UAV in a free fall state, and deploying stabilizing drag surfaces at an aft end of the canister. The method may include opening a hatch proximate a fore-end of the canister, wherein deploying the UAV from the canister includes deploying the UAV through the hatch. The method may include, after deploying the UAV from the canister, deploying a tail of the UAV, deploying a propeller of the UAV, and releasing a lanyard connecting the UAV to the canister.

A further aspect of the present disclosure relates to an unmanned aerial vehicle that includes a fuselage and at least one wing. The wing includes a first wing member pivotally coupled to the fuselage with a first pivot joint, and a second wing member pivotally coupled to the first wing member with a second pivot joint.

The first wing member may be pivotable about a first axis oriented perpendicular to a length dimension of the fuselage, and the second wing member may be pivotable about a second axis oriented parallel with the length dimension of the fuselage. The wing may be operable between a stored position aligned with the fuselage, and an operation position extending out of alignment with the fuselage. At least one wing may include first and second wings, wherein the first and second wings each include the first and second wing members.

DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 3B is a top down view of the unmanned aerial vehicle shown in FIG. 3A in a folded configuration;

FIG. 3C is a forward-looking-aft view of the unmanned aerial vehicle shown in FIG. 3A in a folded configuration;

FIG. 3D is an aft-looking-forward view of the unmanned aerial vehicle shown in FIG. 3A in a folded configuration;

FIG. 4A depicts a side view of an unmanned aerial vehicle in a folded configuration in accordance with one example of the present disclosure;

FIG. 4B depicts a side view of an unmanned aerial vehicle in an unfolded configuration in accordance with one example of the present disclosure;

FIG. 5E depicts an unmanned aerial vehicle at of FIG. 4A at another stage of launch in accordance with one example of the present disclosure;

FIG. 5F depicts an unmanned aerial vehicle at of FIG. 4A at another stage of launch in accordance with one example of the present disclosure;

FIG. 5G depicts an unmanned aerial vehicle at of FIG. 4A at another stage of launch in accordance with one example of the present disclosure;

FIG. 5H depicts an unmanned aerial vehicle at of FIG. 4A at another stage of launch in accordance with one example of the present disclosure;

Figure 1:
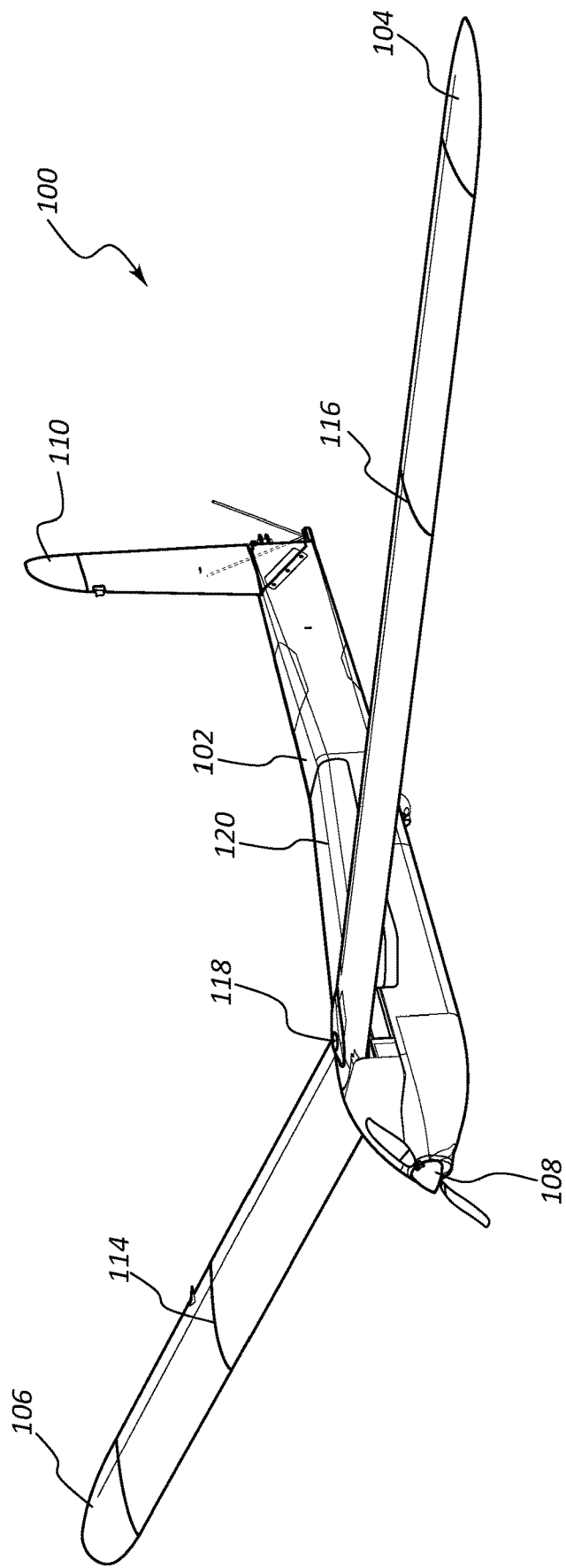
FIG. 1 illustrates an example of an unmanned aerial vehicle in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Unmanned aerial vehicles (UAVs) have multiple uses. UAVs can gather intelligence, deliver payloads, provide reconnaissance, and the like. UAVs, however, have a limited travel time that contributes to the distance and conditions through which the UAV can travel before returning to a pick up location or potentially being forfeited or abandoned. UAVs may be launched in several manners depending upon, for example, the end use of the UAV. Some UAVs may be launched from a ground position. Other UAVs may be launched from another aircraft or vehicle. For example, UAVs may be launched from airplanes, helicopters, submarines, and the like. Launching a UAV from a fixed wing aircraft may permit delivery of the UAV closer to a desired target area. One method of air delivery includes storing the UAV in a cover or housing, which may include a pod, canister, or capsule, and the UAV may be released from the cover or housing (e.g., aerially). The cover or housing may protect the UAV from damage during transport and/or during a free fall stage. The cover or housing may release the UAV at a desired elevation, thus potentially maximizing flight duration and decreasing damage risks to the UAV.

FIG. 1 is a perspective view of an exemplary unmanned aerial vehicle (UAV) 100. The UAV 100 may comprise a body, or fuselage 102. The fuselage 102 may comprise the main body of the UAV 100 and contain various electronic components of the UAV 100 including battery, computer equipment, and the like. The UAV 100 may additionally include a first wing 104 and a second wing 106. The wings 104, 106 may provide the UAV 100 with adequate lift for particular flight patterns (e.g., long flights). In some embodiments, the UAV 100 may be equipped with a set of secondary wings (not shown). This second set of wings may provide additional stability.

The wings 104, 106 may be movable relative to the fuselage 102. For example, the wings 104, 106 may pivot about a pivot joint 118 located on a top portion of the fuselage 102. The pivot joint 118 may alternatively be located at another area of the fuselage 102 such as further forward or aft along the fuselage 102 or on a bottom portion of the fuselage 102. The wings 104, 106 may additionally and/or alternatively fold onto themselves. For example, the wings 104, 106 may include at least one wing joint 114, 116 located a predetermined distance away from the fuselage 102. In one embodiment, the wing joints 114, 116 may be located in approximately a center of the wings 104, 106 between a tip of the wings 104, 106 and the fuselage 102. In other embodiments, the wing joints 114, 116 may be located at another location within the wings 104, 106.

A removable hatch 120 may be positioned just aft of the pivot joint 118 and wings 104, 106. The hatch 120, in a deployed state, may taper from a top surface of the wing 104 towards the fuselage 102. The hatch 120, in a stored state, may be held completely within a common plane as the fuselage and be tucked underneath the wings 104, 106 when the wings are in a stored state.

A propeller 108 may be located at a front end of the UAV (e.g., coupled to the front of the fuselage 102) and may be used to generate a forward force enabling the UAV 100 to take flight and/or remain in flight. Similar to the wings 104 and 106, the propeller 108 may fold onto itself, which may reduce an overall footprint of the UAV 100 during storage.

A tail fin 110 may be positioned near an aft end of the fuselage 102 which may provide the UAV 100 with directional stability. In some instances, the UAV 100 may additionally include a horizontal stabilizer (not shown) or tailplane to stabilize the plane's pitch. Landing gear (not shown) may additionally be included which may allow the UAV 100 to land. The landing gear may comprise wheels, skids, or floats. In some instances, the UAV 100 may include pontoons for aquatic landings. The landing gear may retract to reduce drag during flight.

Figure 2:
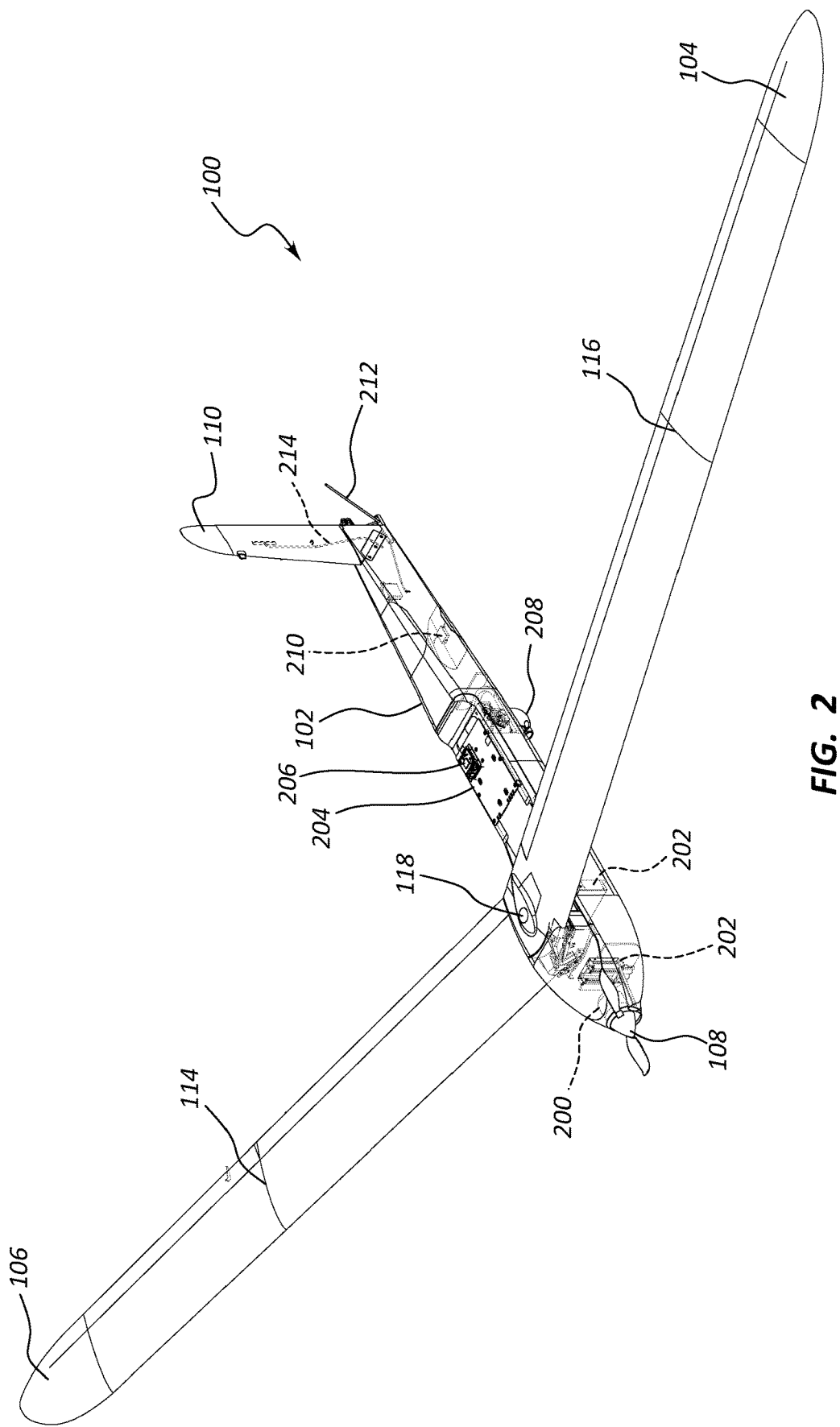
FIG. 2 is a perspective view of an unmanned aerial vehicle of FIG. 1 with an airframe depicted transparently to reveal other components.

FIG. 2 is a perspective view of an unmanned aerial vehicle 100 with the fuselage 102 depicted as a transparent component for purposes of viewing various internal components of the UAV 100 and with the hatch 120 removed. Again, the UAV 100 may include a first wing 104, a second wing 106, a propeller 108, and a tail fin 110. The UAV 100 may also incorporate additional or alternative features described with reference to FIG. 1. The UAV 100 may have several components to aid in flight. The UAV 100 may also have additional components that are mission and/or use dependent.

For example, the UAV 100 may include a motor 200. The motor 200 may be proximate a front end of the fuselage 102 and may be coupled to the propeller 108 to turn or drive the propeller 108. The motor 200 may be powered by one or more batteries 202 located within the fuselage 102. The batteries 202 may be single-use batteries or may be rechargeable. Other means of powering the motor 200 may also be used. For example, the motor 200 may run on a liquid fuel, solar power, fuel cell, or the like.

The fuselage 102 may additionally include avionics 204. The avionics 204 may include one or more avionic systems and/or components including, for example, communications systems, navigation systems, display and management of systems, and the like. The avionics 204 may control various portions of the UAV 100. The avionics 204 may communicate with a remote system to control the UAV 100. The avionics 204 may alternatively be programmed to carry out a specific mission that is independent of human interaction. The avionics 204 may additionally communicate with an on-board global positioning system (GPS) 206. The avionics 204 may also control a payload 208.

In some embodiments, the payload 208 may be an intelligence, surveillance, and reconnaissance (ISR) payload. The ISR payload may be remotely operated or, alternatively, may be independently controlled. The ISR payload may include a radar system, electro-optical/infrared (EO/IR) sensors, processors, cameras, microphones, speakers, and other gadgetry to perform a mission. The payload 208 may include various other systems or devices such as supplies for people, or other cargo to be dropped off or carried to a location. The size of the payload 208 may be dependent upon the size of the UAV. A larger UAV 100 may be capable of carrying a larger payload 208.

Figure 3A:
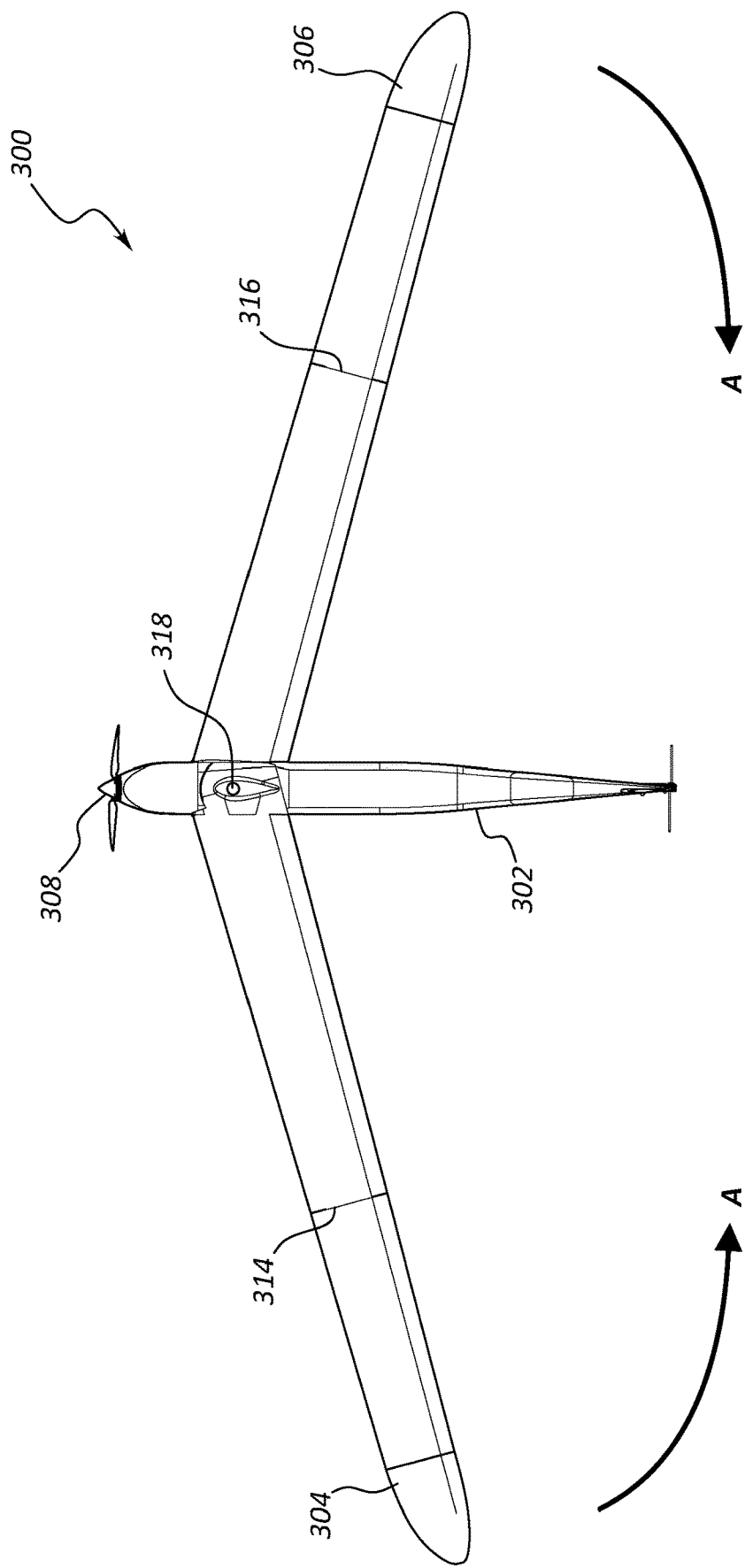
FIG. 3A is a top down view of an example unmanned aerial vehicle in accordance with the present disclosure.

The UAV 100 may include a retention device 212. In some embodiments, the retention device 212 may be proximate the tail fin 110. The retention device 212 may hold the wings 104, 106 in a folded configuration. For example, the retention device 212 may releasably couple with a mating feature on each wing 104, 106 when the wings 104, 106 are folded (see FIGS. 3B and 3D). For example, the wings 104, 106 may each have a notch or recess, which may couple with the retention device 212. Tension applied to the retention device 212 may maintain the connection. In some embodiments, the retention device 212 may be spring loaded and may have a first position and a second position. The first position may engage the wings 104, 106 in a folded and/or closed configuration. The second position may be a released position in which the wings 104, 106 are in an operable or unfolded configuration. In some embodiments, the retention device 212 may be used to store the UAV 100 in a storage container such as a canister or pod. Once the UAV 100 is placed within a storage container, a user may manually disengage the retention device 212. In other embodiments, the retention device 212 may automatically disengage as the UAV 100 is released from the canister. In other embodiments, the retention device 212 may be operated between connected and released positions by operating an actuator from a remote location, or based on a control signal originating from a processor/controller onboard the UAV 100.

The UAV 100 may include a radio 210 and an antenna 214. The radio 210 and antenna 214 may be a part of the avionics 204 or may be a separate component or components. The radio 210 and antenna 214 may be communicatively coupled with the avionics 204 to assist with, for example, steering and reprogramming or directing of the UAV 100. In some embodiments, the antenna 214 may be located external the fuselage 102. In other embodiments, the antenna 214 may be located internal to the UAV 100.

FIG. 3 is an example of an unmanned aerial vehicle 300 which may be launched from a multitude of locations. The UAV 300 may have similar features and characteristics as the UAV 100 described with reference to FIGS. 1 and 2. The UAV 300 may be stored in a canister and/or pod for transport and/or launching.

The UAV 300 may include a fuselage 302, wings 304, 306 and a propeller 308. The UAV 300 may additionally include a tail fin (not shown). The UAV 300 may include a hinge 318 located central to the UAV 300 which may enable the wings 304, 306 to pivot or scissor relative to the fuselage 302 as indicated by arrows A. The pivot or scissoring movement in the direction A may include rotation of the wings 304, 306 about rotation axes that are oriented perpendicular to a length dimension of the fuselage 302. In a collapsed state (e.g., see FIG. 3B), the wings 304, 306 may align with and/or overlap the fuselage 302.

Depending on the desired mission of the UAV 300 and size of the UAV 300, the UAV 300 may additionally include one or more wing joints 314, 316 on the wings 304, 306. The wing joints 314, 316 may enable the wings 304, 306 to fold onto themselves (e.g., a first portion of a wing folding relative to, and on to, a second portion of the same wing). This configuration may allow a larger wingspan to fit within a relatively small storage compartment or launching pod.

The wing joints 314, 316 may include hinges such that the wings 304, 306 fold onto themselves. The wing joints 314, 316 may alternatively comprise a variety of other joints such as pivot joints, saddle joints, planar joints, slider joints, or the like. For example, the wing joints 314, 316 may include slider joints such that the wings 304, 306 telescope inward. In one embodiment, the axis of the wing joints 314, 316 (i.e., the axis about which a first wing portion folds relative to a second wing portion) may be substantially perpendicular to a forward edge of the wings 304, 306. In other embodiments, the wing joints 314, 316 may be canted such that the wing joints 314, 316 form an obtuse angle in relation to the fuselage 302 when the wings 304, 306 have been deployed about the hinge 318 associated with the fuselage 302. Generally, the wing joints 314, 316 may provide pivot axes that are oriented substantially parallel with a length dimension of the fuselage 302 when the wings 304, 306 are in the fully deployed position shown in FIG. 3A.

The wings 304, 306 may include multiple joints such that the wings 304, 306 may double fold or pivot, or otherwise be lengthened. The fuselage 302 may incorporate additional wings (not shown) such as horizontal stabilizers, tail planes, elevators, or the like. The additional wings may be hinged and/or pivot mounted such that an overall collapsed state of the UAV 300 remains within a predetermined space envelope.

FIGS. 3B and 3C show a top down view and a forward-looking-aft view, respectively, of the exemplary UAV 300 in a folded configuration with the wings 304, 306 each folded on themselves (about wing joints 314, 316, respectively) as well as being pivoted relative to the fuselage about hinge 318. This compact configuration may enable the UAV 300 to fit within a relatively small storage container or deployment pod.

As can be seen, the wings 304, 306 condense and fold such that, in FIG. 3B, the fuselage 302 is barely visible from a top down view. The wings 304, 306 may be considered to be in a stored, folded, fully retracted, collapsed, or undeployed position in the arrangement of FIG. 3B. The wings 304, 306 may be aligned with and/or overlapping the fuselage 302. A retention device 320 may be proximate a first wing spar 322 and/or a second wing spar 324. The retention device 320 may retain the wings 304, 306 in a folded configuration. For example, the first wing spar 322 and second wing spar 324 may include a knob 326, 328 (FIG. 3D) which may couple to the retention device 320 in a folded configuration.

Additionally, as seen in FIG. 3C, the collapsed envelope of the wings 304, 306 is about as wide (e.g., not much wider than) as the fuselage 302. The wings 304, 306 and fuselage 302 sizes may vary depending upon mission and end use, but in a condensed stated, the wings 304, 306 and fuselage 302 may be comparably sized to form a compact collapsed package.

Figure 3E:
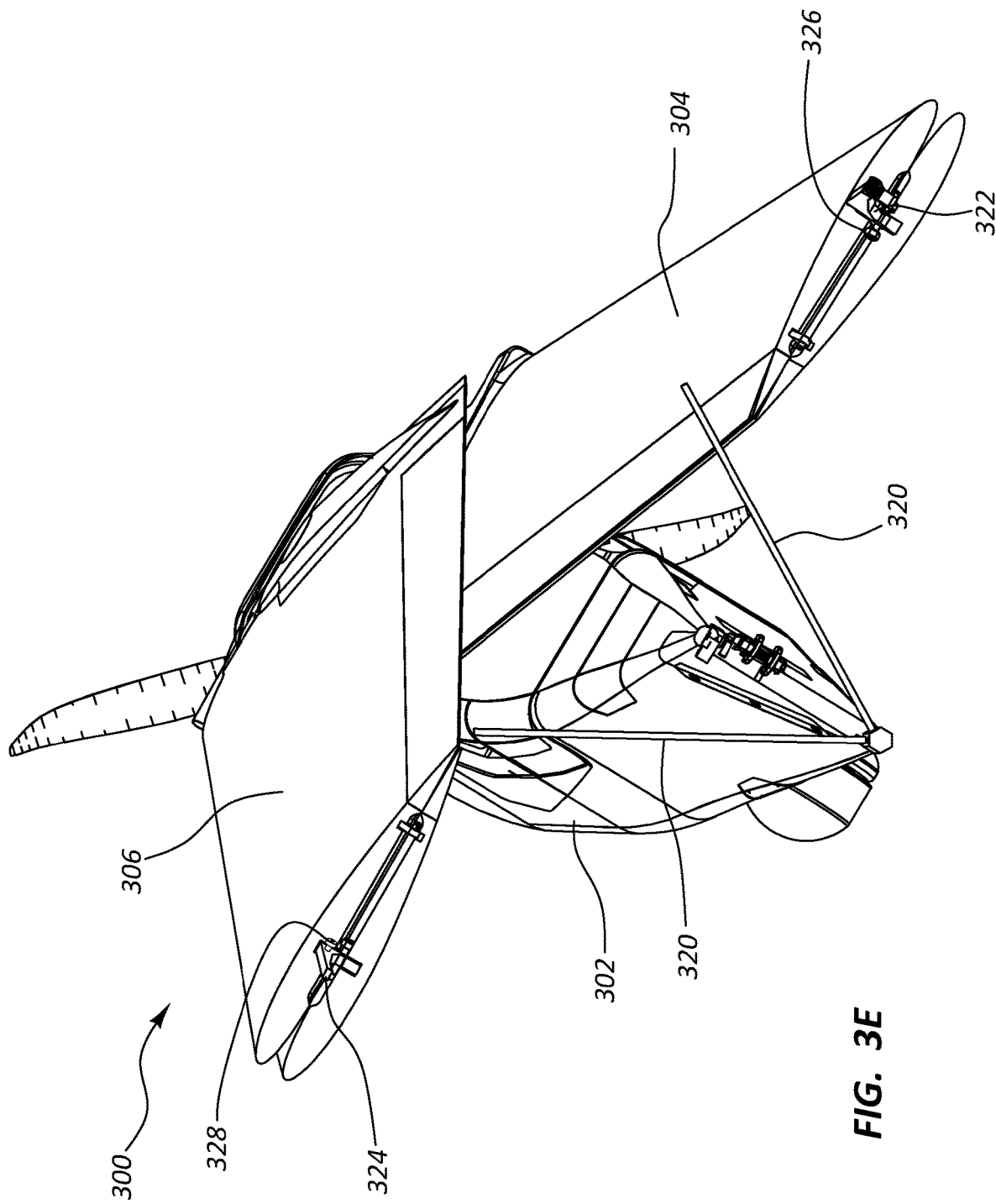
FIG. 3E is an aft-looking-forward view of the unmanned aerial vehicle shown in FIG. 3A transitioning to an unfolded configuration.

FIGS. 3D and 3E depict an aft looking forward view of the exemplary UAV 300. In FIG. 3D, the UAV 300 is shown in a collapsed stated with the wings 304, 306 folded. The retention device 320 is shown as a pair of elongated members forming a substantially V-shape. The retention device 320 may comprise a spring. For example, the elongated members may comprise a flexible material such that in a collapsed state, the elongated members store energy which is released when the UAV 300 is released from the canister. In other embodiments, the retention device 320 may comprise multiple components. For example, the retention device 320 may incorporate a first device to retain the wings in a folded position and a second device, such as a spring, to push the wings 304, 306 into an operational position. In some embodiments, knobs 326, 328 may be proximate the wing spars 322, 324. The knobs may have a notch or other feature to releasably connect to the retention device 320. A tail wing 310 is shown pivoted about a hinge 311 into a stowed position arranged extending along the side surface of the fuselage.

In FIG. 3E, the UAV 300 is shown transitioning from a collapsed state to an operational state. The retention device 320 has released the knobs 326, 328 and exerted a force on the wing spars 322, 324 to aid the wings 304, 306 in unfolding.

FIGS. 4A and 4B show a side view of an exemplary UAV 400. The UAV 300 may have similar features and characteristics as the UAV 100 described with reference to FIGS. 1, 2, and/or 3. The UAV 400 may be stored in a canister and/or pod for transport and/or launching.

The UAV 400 may include a fuselage 402, wings 404, 406 and a propeller 408. The UAV 400 may additionally include a tail fin 410 that is connected to a rear or tail end of the fuselage 402 with a hinge 411. The hinge 411 is arranged at a canted angle relative to a length dimension of the fuselage 402. The UAV 400 may include a pivot joint (e.g. pivot joint 118, FIG. 1; hinge 318, FIG. 3) located central to the UAV 400 which may enable the wings 404, 406 to pivot or scissor relative to the fuselage 402. In a collapsed state (e.g., see FIG. 4A), the wings 404, 406 may align with and/or overlap the fuselage 402. A removable hatch 420 proximate a top side of the fuselage may be in a collapsed state when the wings 404, 406 are in a folded configuration.

The hatch 420 may be removed completely from the fuselage 402 to enable access to one or more interior components of the UAV. The hatch 420 may movably attach to the fuselage 402. For example, in a collapsed state, a top surface 422 of hatch 420 may be arranged substantially parallel to a top surface 424 of the fuselage 402. In some embodiments, the wings 404, 406 may provide a retaining force on the hatch 420 to hold the hatch 420 in a collapsed state. In other embodiments, one or more retention devices may hold the hatch 420 in a collapsed state.

As shown in FIG. 4B, in an operational state, a front end 426 of the hatch 420 is in a raised position. For example, the hatch 420 may be canted such that the top surface 422 is no longer substantially planar to the top surface 424 of the fuselage 402. Instead, a spring 428 or other device may raise the front end 426 of the hatch 420 such that the front end 426 of the hatch 420 is substantially parallel with the wings 404, 406 when the UAV 400 is viewed from a side angle. The top surface 422 of the hatch 420 may then slope towards the top surface 424 of the fuselage 402 at a rear end 430 of the hatch 420. The rear end 430 of the hatch 420 may be pivotally and/or removably coupled to the fuselage 402. This may enable the hatch 420 to change positions from a collapsed state to an operational state while also allowing the hatch 420 to be completely removable from the fuselage 402.

FIGS. 5A-5H depict an example of a UAV 500 at various stages of an air launch sequence. The UAV 500 may have similar features as the UAV 100, 300 described with reference to FIGS. 1-3. The UAV 500 may be stored in a canister 520. The canister 520 may be classified as cargo and may be easily transportable. The canister 520 may comprise, for example, a relatively sturdy, four-sided box. In other embodiments, the canister 520 may comprise a cylindrical housing, a soft-walled housing, a fabric housing, or the like.

Figure 5D:
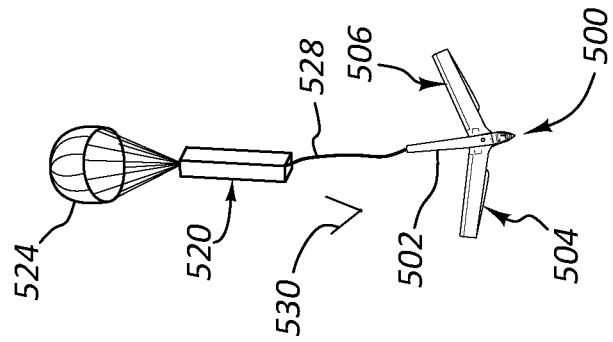
FIG. 5D depicts an unmanned aerial vehicle at of FIG. 4A at another stage of launch in accordance with one example of the present disclosure.
Figure 5C:
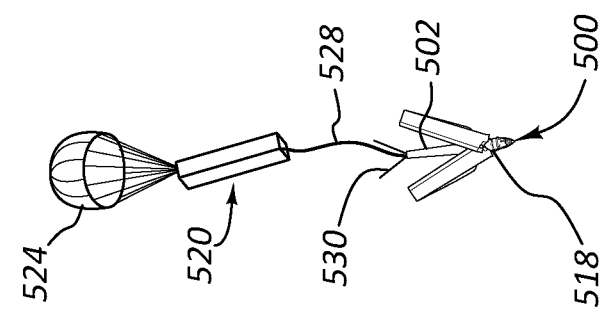
FIG. 5C depicts an unmanned aerial vehicle at of FIG. 4A at another stage of launch in accordance with one example of the present disclosure.
Figure 5B:
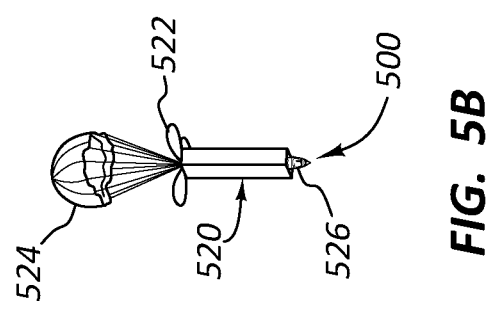
FIG. 5B depicts the unmanned aerial vehicle of FIG. 4A at another stage of launch in accordance with one example of the present disclosure.
Figure 5A:
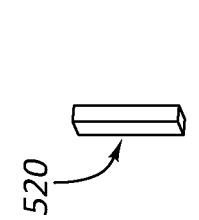
FIG. 5A depicts an unmanned aerial vehicle at a stage of launch in accordance with one example of the present disclosure.

FIG. 5A shows a canister 520 as it would appear in an unlaunched, transport state. The canister 520 may be light enough to be transportable by a single person. The canister 520 may be easily released from a fixed wing aircraft. For example, the canister 520 may be manually disembarked from a fixed wing aircraft. A person may throw or otherwise deploy the canister 520 from the aircraft. The canister 520 may additionally be launched using a launching device or may be deployed from a belli-pod or similar cargo device mounted external to an aircraft fuselage. The aircraft may be in flight which may result in the canister 520 descending towards earth once deployed from the aircraft.

As the canister 520 begins its descent, control surfaces, or stabilizing drag surfaces 522 may deploy from an aft end of the canister 520. The stabilizing drag surfaces 522 may be any shape or contortion and may aid in stabilizing the canister 520 during its descent such as decreasing free spin during the descent. Depending upon the elevation of the drop from the aircraft or other location, the canister 520 may release a drogue chute 524 on its aft end. The drogue chute 524 may be a parachute that operates to slow the descent of the canister 520. The drogue chute 524 may be manually released (e.g., using an electronically actuated release mechanism, a timer, a remote control, an elevation detection unit, or the like). Alternatively, the drogue chute 524 may be automatically released based on one or more criteria (e.g., detected decent velocity, time period from when deployed from the aircraft, etc.).

As the drogue chute 524 is released, the UAV 500 may undergo a complete system start and diagnostic sequence. The UAV 500 may begin to exit the canister 520 from a forward end (e.g., a lower end, as viewed in FIGS. 5A-5H) of the canister 520. A nose 526 of the fuselage is visible in FIG. 5B.

FIG. 5C shows the UAV 500 fully exited from the canister 520. At this point, the fuselage 502 has cleared the canister 520 but may still be attached to the canister 520 via a lanyard 528 or other connection device. The lanyard 528 may continue to stabilize the UAV 500 until it is fully functional. For example, the lanyard 528 may maintain attachment of the UAV 500 to the canister 520, whose descent is being slowed via the drogue chute 524. The UAV 500 typically is slowed by the drogue chute 524 until UAV 500 is fully operational. This arrangement may limit the possibility that the UAV 500 descends at an overly rapid rate or prematurely achieves full deployment in high wind conditions that may cause damage to the UAV 500.

As soon as the fuselage 502 and folded wings 504, 506 clear the confines of the canister 520, the wings 504, 506 may begin to unfold. Specifically, the wings 504, 506 begin to pivot about a hinge 518 associated with the fuselage (e.g., pivot joint 118 or hinge 318 described above). In other configurations, the wings 504, 506 may be additionally or alternatively held into place by a locking mechanism, which may need to be selectively released. For example, a retention device 530 may have exerted a force on the wings 504, 506, beginning when the wings 504, 506 transition to an operational state. As the UAV descends, the wings 504, 506 may pivot about hinge 518 into an operational position. During descent, the propeller, which may be collapsed in a stored position, may additionally be released or otherwise unlocked from a stored position and may lock into an operational condition.

FIG. 5D shows the wings 504, 506 unfolding further as the canister 520 and UAV 500 continue to descend. As the wings 504, 506 begin to reach a fully deployed and operational position relative to the fuselage, first and second wing members 550, 552 of each of the wings 504, 506 may begin to unfold to an operational length. For example, as described above, the wings 504, 506 may be pivotally mounted on the fuselage 502 about hinge 518. In one embodiment, the pivot joint may be spring-loaded such that when the wings 504, 506 are released or exit the canister 520, the wings 504, 506 are biased to pivot or scissor about a pivot joint outward from the fuselage to reach an operational position. The operational position may be conceptually transverse to the fuselage 502. The operational position may additionally and/or alternatively comprise aft swept or forward swept airfoils. The retention device 530 may be ejected from the fuselage 502 once the wings 504, 506 reach an operational state.

As the wings 504, 506 experience drag during descent, the wings 504, 506 may unfold about their wing joints (e.g., wing joints 114, 116 and 314, 316 described above) as shown in FIG. 5E. For example, aerodynamic forces may aid the wings 504, 506 in unfurling to an operational length. In some embodiments, the unfolding of the wings may be aided by a biasing member or other mechanical system. In one embodiment, the outer wing members 552 of the wings 504, 506 are folded beneath the inner wing member 550 of the wings 504, 506 so that the wings do not begin to unfold until the pivoting of the wings 504, 506 relative to the fuselage about hinge 518 is complete. Such a configuration may enable passive, automatic wing deployment since the outer wing members 552 need to clear the fuselage (e.g., after pivoting of the wings 504, 506 relative to the fuselage 502) before unfolding.

FIG. 5F shows the UAV 500 with its wings 504, 506 in a fully deployed and operational position (both pivoted relative to the fuselage and unfolded). The tail fin 510 may additionally unfold from a stored position as shown in FIG. 5G. Once the UAV 500 has fully unfolded and is in operational position, the UAV 500 may release the lanyard 528 connecting it to the canister 520.

FIG. 5H shows the UAV 500 completely released from the canister 520 and operating. The UAV 500 may be remotely controlled or may be autonomous. The UAV 500 may then perform its mission or may provide for recreational or commercial use.

Figure 6:
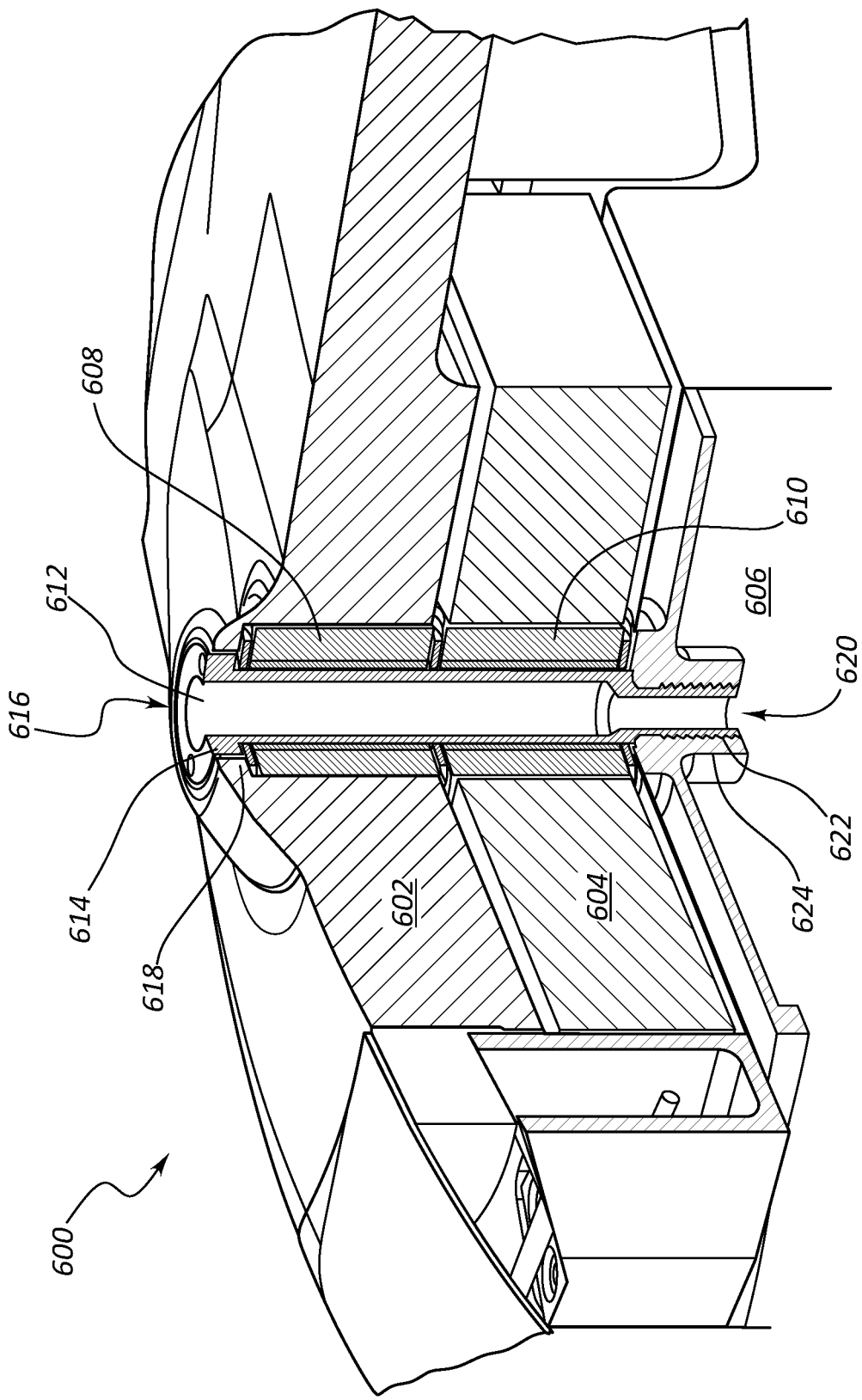
FIG. 6 is a cutaway view of an example pivot joint in accordance with the present disclosure.

FIG. 6 is a cutaway view of an exemplary pivot joint 600 that may be used to couple a first wing 602 and a second wing 604 to a fuselage 606 of a UAV. The first wing 602 and second wing 604 may each include a thru hole 608, 610 sized and configured to accept a pin 612. The pin 612 may have a shoulder 614 on a first end 616, and the shoulder 614 may rest on a chamfer 618 in the first wing 602.

The pin may be threaded at a second end 620, opposite the first end 616. The threads 622 may mate with a threaded portion 624 of the fuselage 606. The threaded portion 624 of the fuselage 606 may be integral to the fuselage 606. For example, the threaded portion 624 may form a seamless assembly with the fuselage 606. In some embodiments, the threaded portion 624 may be internal to the fuselage 606. In another embodiment, the threaded portion 624 may be welded or otherwise adhered to the fuselage 606. The threaded portion 624, in some instances, may be a separate piece such as a nut or other female threaded member which may be internal to the fuselage 606 and may couple the pin 612 to the fuselage 606.

Figure 7A:
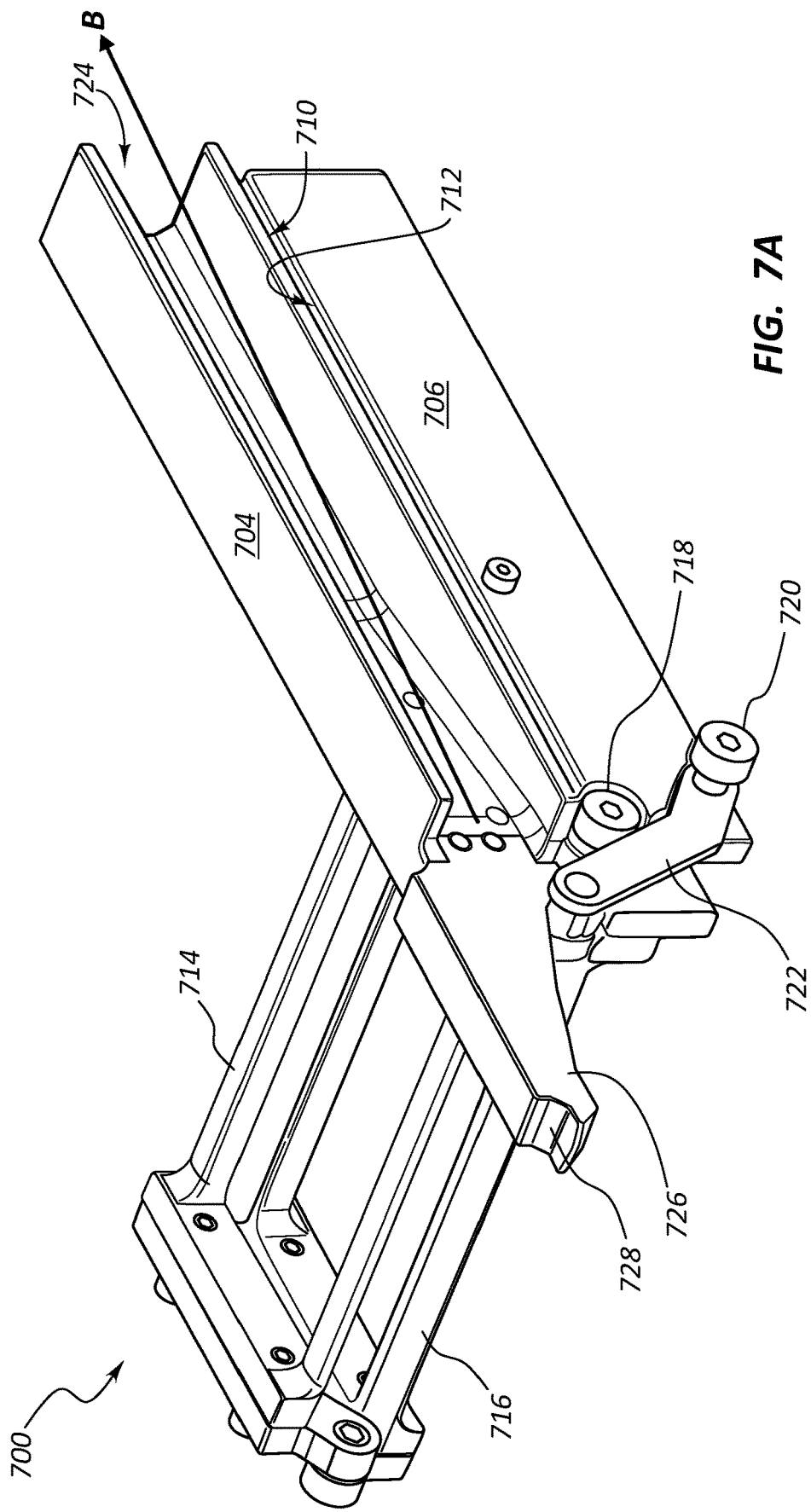
FIG. 7A is a perspective view of an example wing joint in accordance with the present disclosure.
Figure 7B:
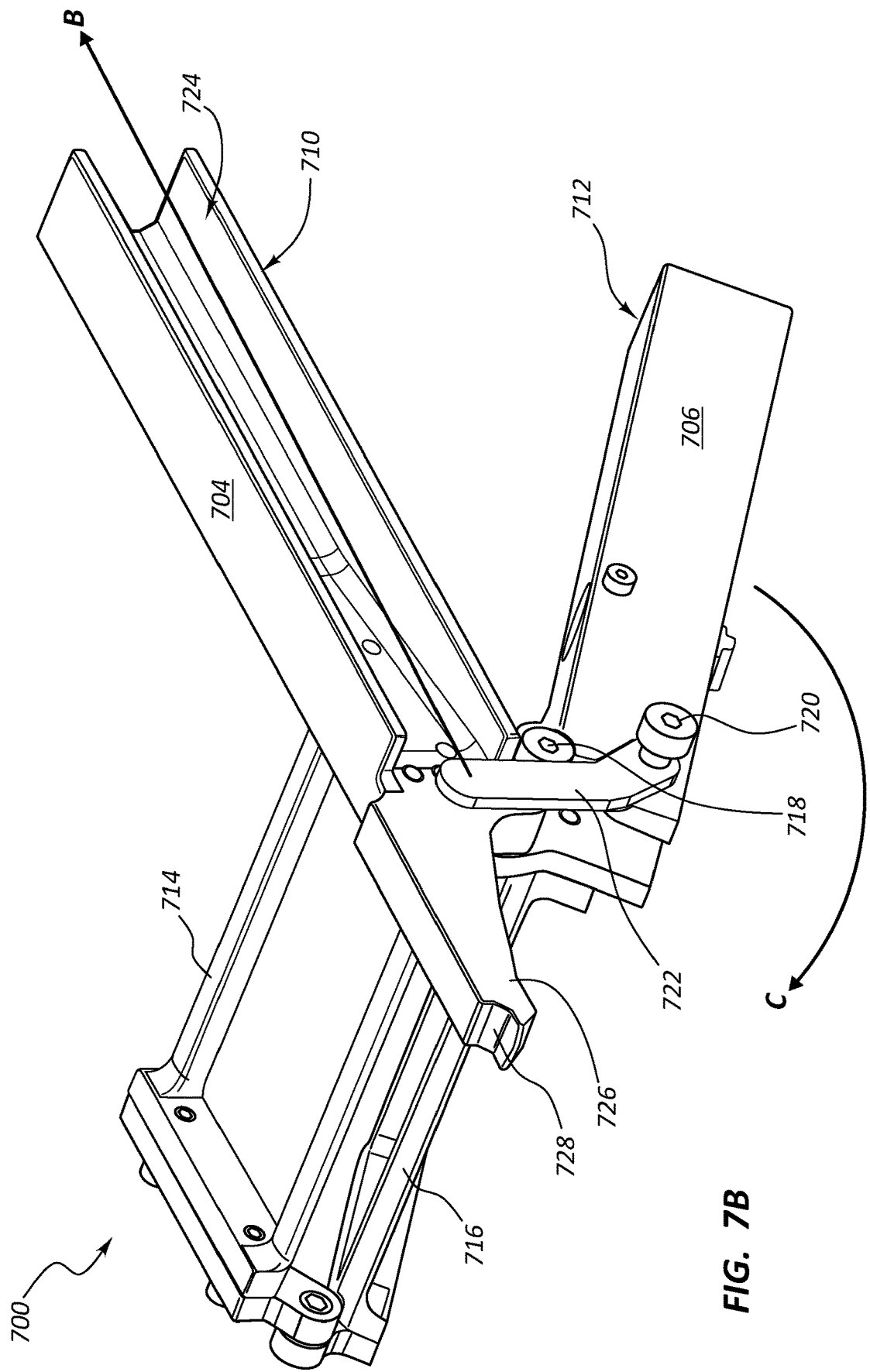
FIG. 7B is a perspective view of the example wing joint shown in FIG. 6A with the wing joint in transition from a collapsed state to a deployed state.
Figure 7C:
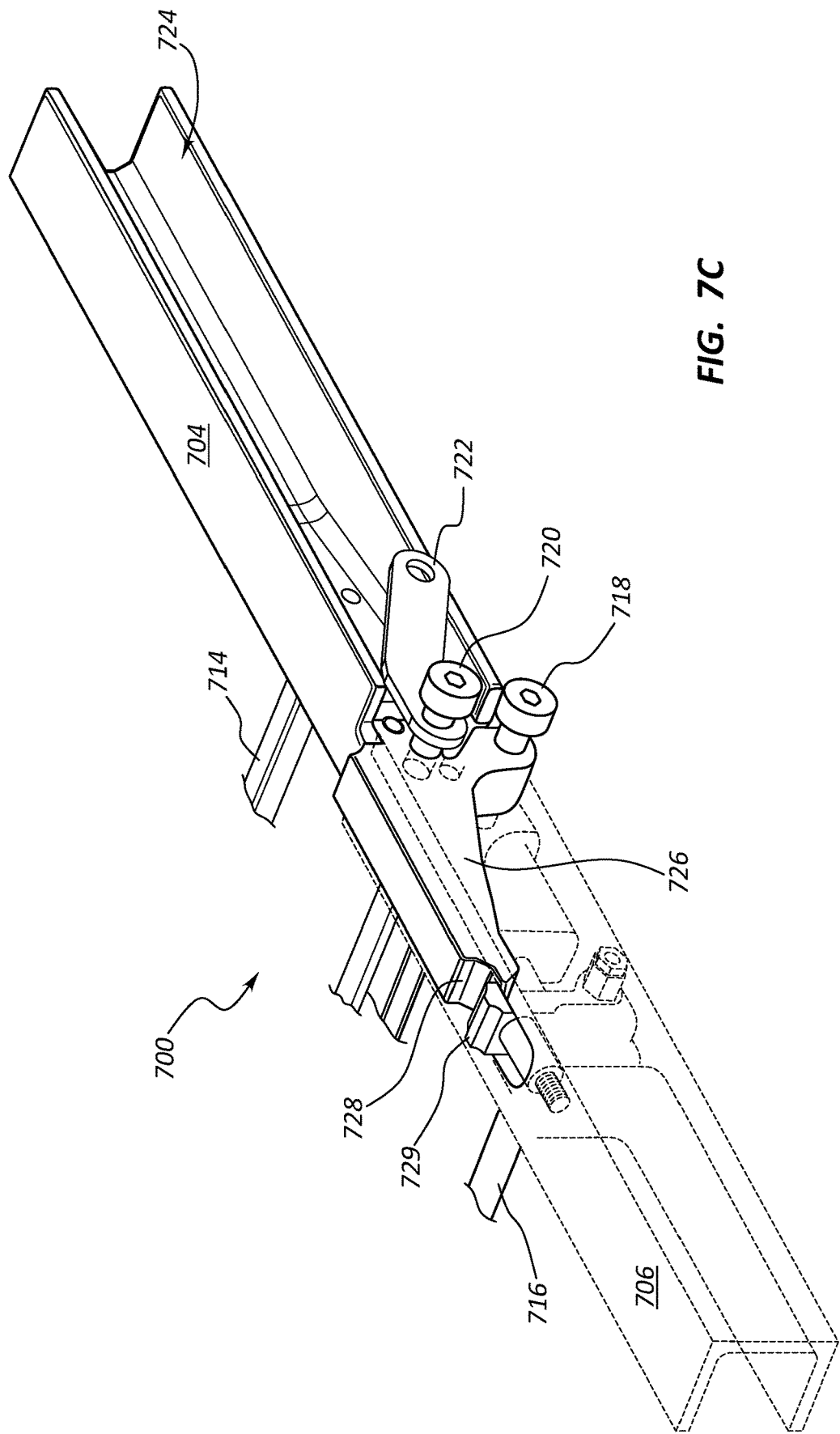
FIG. 7C is a perspective view of the example wing joint shown in FIG. 6A with the wing joint shown after deployment.

FIGS. 7A, 7B, and 7C show an exemplary joint mechanism 700 for a folding wing. The wing may comprise two or more pieces, each joined by a hinge or joint mechanism 700. The joint mechanism 700 may connect a first wing spar 704 with a second wing spar 706. The first wing spar 704 or second wing spar 706 may be coupled to the fuselage. The first wing spar 704 may be coupled to the fuselage. In a collapsed state, as shown in FIG. 7A, a bottom 710 of the first wing spar 704 may face a bottom 712 of the second wing spar 706. In other embodiments, the first and second wing spars 704, 706 may have top sides facing in a collapsed position. In another embodiment, the wing may have multiple joints which may accordion wing spars together. Each wing on a UAV may be a mirror image of an oppositely positioned wing (i.e. fold identically) or may be reversed.

The first wing spar 704 may have a first brace 714 and the second wing spar 706 may have a second brace 716. The braces 714, 716 may provide relative structural stability to the wing spars 704, 706 as they unfold. The braces 714, 716 may also be hinged together. For example, the braces 714, 716 may include a fulcrum 718, a pivot 720, and a lever arm 722. The lever arm 722 may rotate about the fulcrum 718 and slide generally in the direction indicated by arrow B in a groove 724 formed in the first wing spar 704. A spring (not shown) may be attached to the lever arm 722 and may cause a pulling force in the direction of the arrow B. The pulling force may provide an initial opening moment force for unfolding the wing.

FIG. 7B shows the lever arm 722 partially rotated about the fulcrum 718. The second wing spar 706 may rotate about the pivot 720 as shown by arrow C. FIG. 7B also shows the lever arm 722 beginning to move along arrow B in the groove 724.

FIG. 7C shows the wing in an operational, open position. A locking mechanism 726 may include a groove 728 which may couple to a biased pivoting latch member 729 on the second wing spar 706. The locking mechanism 726 may maintain the wing's open, operational position. In some embodiments, the joint mechanism 700 may be canted (or pivot about an axis that is canted) at an angle away from the fuselage. This may aid the wing in unfolding during descent by creating desired aerodynamic forces on the unfolded portion of the wing.

The wing may unfold using an elastic spring force. For example, the wing may be held in a folded position when stored in a canister (e.g., canister 520). When the wing fully exits the canister, a spring or other biasing member (not shown) may act on the folded wing and force the wing to begin to unfold.

Figure 8:
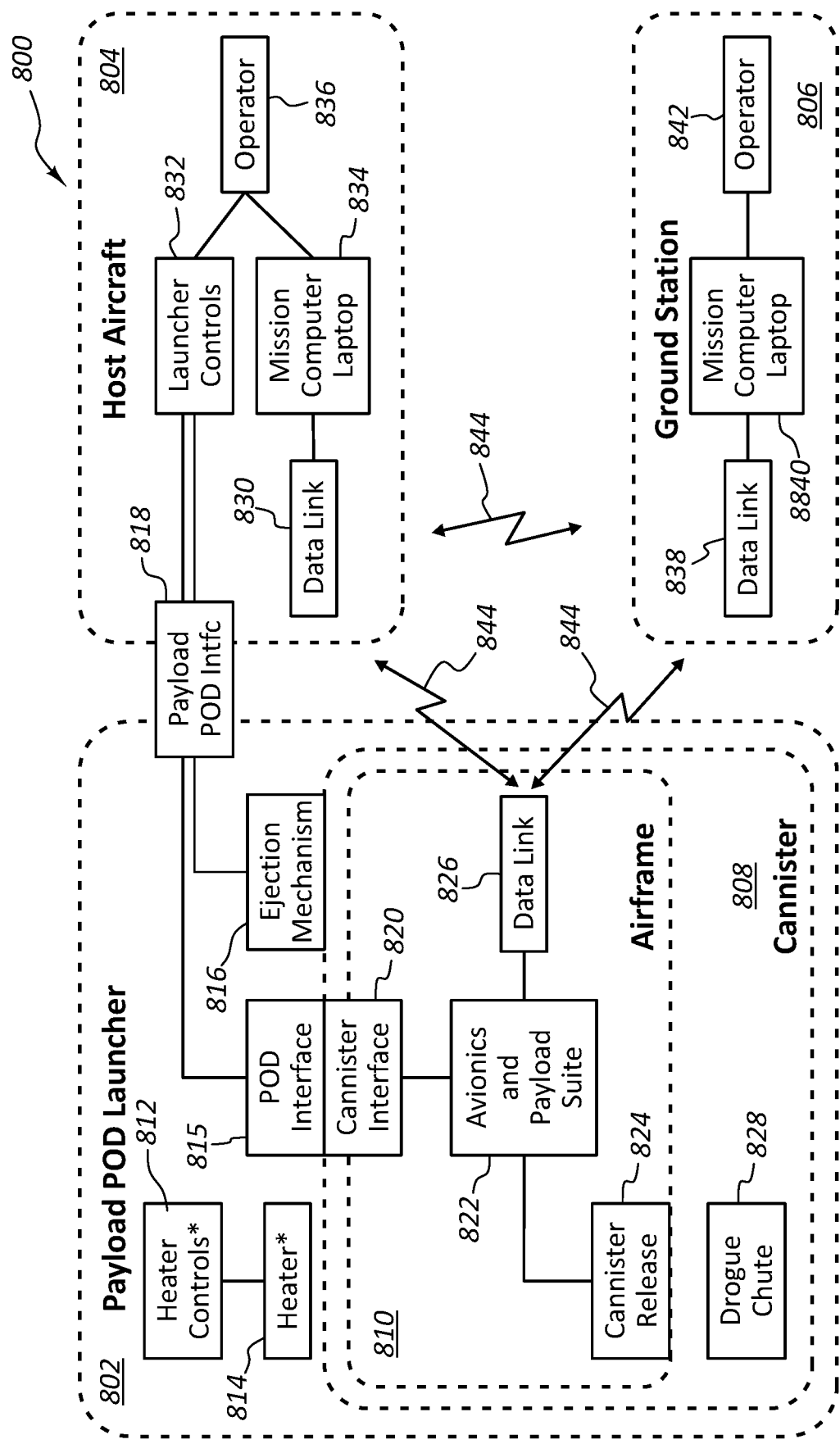
FIG. 8 is an example system schematic in accordance with the present disclosure.

FIG. 8 is an example of a simplified block diagram of a UAV system 800 as a whole. The system 800 may include a payload pod launcher 802, a host aircraft, 804 and a ground station 806. The payload pod launcher 802 may include a canister 808 and a UAV 810. The UAV 810 may include features described with reference to FIGS. 1-6.

The payload pod launcher 802 may include heater controls 812 and a heater 814. The heater 814 may provide heat to the UAV 810 stored within the canister 808. For example, at high altitudes, low temperatures may be present, which may inhibit certain functions of the stored UAV 810. The heater 814 may provide heat to the UAV 810, or the enclosure within which UAV 810 is stored, that helps ensure proper function of the UAV 810 components when the UAV is activated.

The payload pod launcher 802 may also include a pod interface 815. The pod interface 815 may provide an interface with the canister 808. The interface may be a communications interface which may enable the canister 808 to be launched from the payload pod launcher 802. For example, an ejection mechanism 816 may be triggered to launch the canister 808 from the payload pod launcher 802. In alternative embodiments, the canister 808 may be launched without the use of a payload pod launcher 802.

The payload pod launcher 802 may additionally include a payload pod interface 818. If a payload pod launcher 802 is used to launch a canister 808, the interface 818 may enable the host aircraft 804 to remotely control the payload pod launcher 802.

The canister 808 may include a drogue chute 828 and one or more control surfaces (not shown). The drogue chute 828 may be released from the canister 808 during descent and act as a parachute that slows the canister's 808 speed as it journeys to the earth. The UAV 810 may be included within the canister 808 such as has been described above. The UAV 810 may include a canister release 824, a canister interface 820, an avionics and payload suite 822, and a data link 826. The canister release 824 may activate a release mechanism to release the UAV 810 from the canister 808. The avionics and payload suite 822 may include various avionics and payloads as discussed with reference to FIG. 2. The data link 826 may comprise a communications system and antenna such as discussed with reference to FIG. 2.

The host aircraft 804 may include launcher controls 832, a data link 830, a mission computer laptop 834, and an operator 836. The operator 836 may be flying the aircraft 804. The operator 836 may be onboard the aircraft 804 as in a manned system or may be remotely controlling the aircraft 804. For example, the aircraft 804 may be a larger unmanned aerial vehicle which may launch a smaller UAV 810. The mission laptop computer 834 and data link 830 may provide communication with the UAV 810. The pod launch controls 832 may control the launcher 802 and be communicatively coupled via the payload pod interface 818.

The ground station 806 may include a data link 838, a mission computer laptop 840 and an operator 842. Data links 826, 830, 838 may be wirelessly connected to each other via communication links 844.

Figure 9:
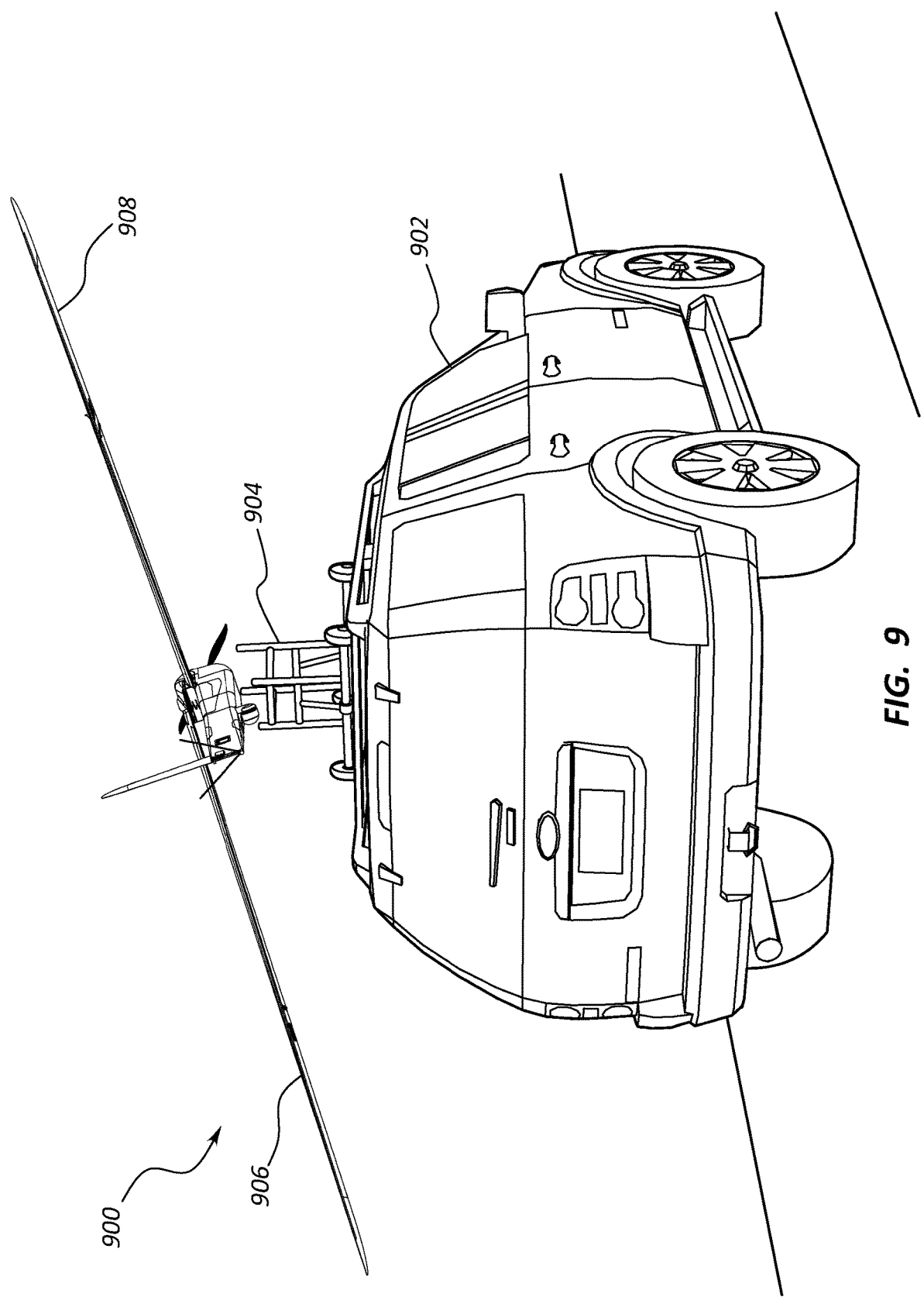
FIG. 9 is an example launching method in accordance with the present disclosure.

FIG. 9 illustrates an example of an alternative launch mechanism that may be used in connection with at least some of the systems and devices disclosed herein. The UAV 900 may be mounted atop a terrestrial vehicle 902 using one or more mounting apparatus 904. Once the wings 906, 908 experience enough lift as the terrestrial vehicle 902 achieves certain speed, the UAV 900 may take flight. The UAV 900 may be collapsible to be mobile, and may be storable in a canister or pod. Typically, the UAV 900 is manually removed from its pod prior to being mounted to the terrestrial vehicle 902. The pod may classify the UAV 900 as cargo, which may provide ease of transporting the UAV 900.

Figure 10B:
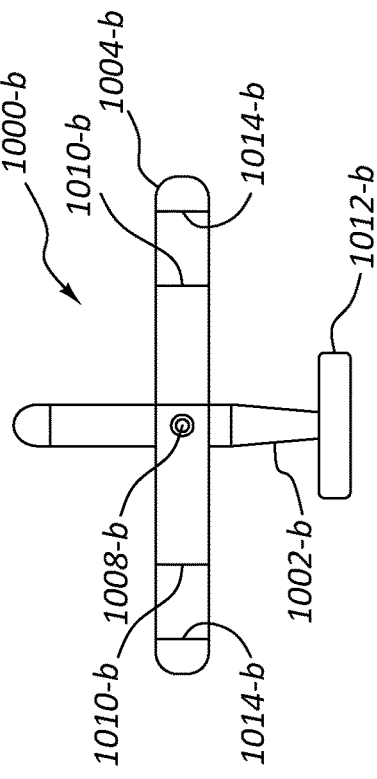
FIG. 10B is another example of an unmanned aerial vehicle in accordance with the present disclosure.
Figure 10C:
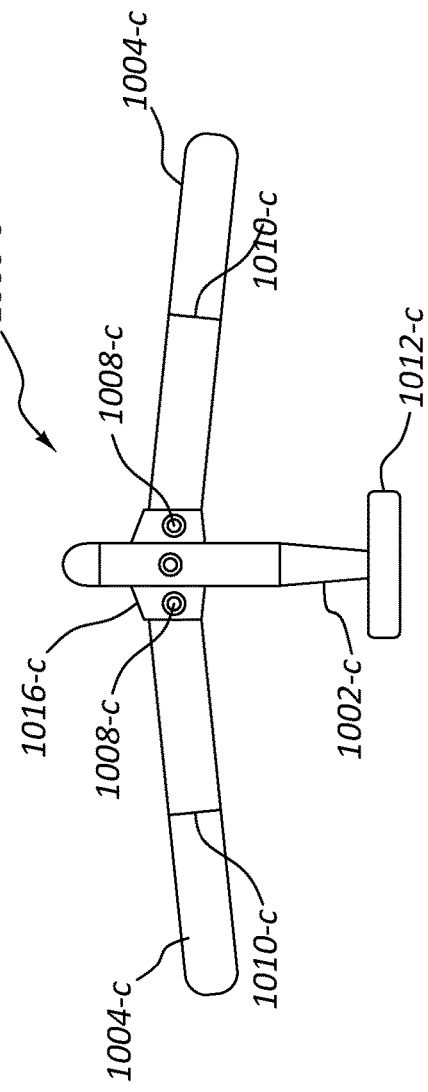
FIG. 10C is another example of an unmanned aerial vehicle in accordance with the present disclosure.
Figure 10A:
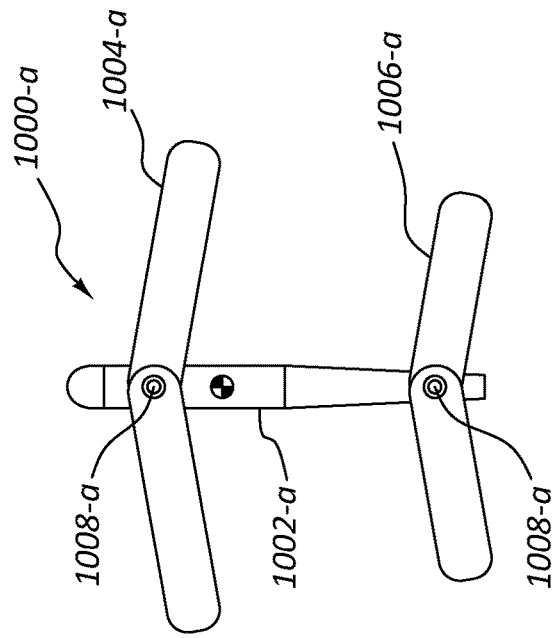
FIG. 10A is a further example of an unmanned aerial vehicle in accordance with the present disclosure.

FIGS. 10A-10C show alternative embodiments of connecting folding wings for use in potential extended duration flight patterns. The embodiments may include various numbers of wings and locations for joining the wings to the fuselage. The wings may contain one or more hinge joints to further expand the wingspan upon deployment from a pod.

For example, a first variation of the UAV 1000-a may include a first and second pair of wings 1004-a, 1006-a. The wings 1004-a, 1006-a may be pivotally mounted to the fuselage 1002-a via one or more pivot joints 1008-a.

A second variation of the UAV 1000-b may include a single pair of wings 1004-b attached to the fuselage 1002-b via a pivot joint 1008-b. The wings 1004-b may include at least one hinge (folding) joint 1010-b. In some embodiments, each wing 1004-b may include multiple hinge joints 1014-b. The UAV 1000-b may include a tail fin 1012-b.

A third variation of the UAV 1000-c may include a mounting bracket 1016-c which may be coupled to the fuselage 1002-c. The wings 1004-c may be pivotally coupled to the mounting bracket 1016-c via one or more pivot joints 1008-c. The wings 1004-c may additionally include at least one hinge joint 1010-c which may enable the wings 1004-c to fold. The UAV 1000-c may also include a tail fin 1012-c.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The invention claimed is:

1. An unmanned aerial vehicle (UAV), comprising:
a fuselage having a front end and a rear end;
a first wing having a first wing body and a second wing body; and
a second wing having a first wing body and a second wing body, wherein at least one of the first or second wings comprises a first wing spar and a second wing spar;
a retention device attached to the rear end of the fuselage;
wherein the first wing bodies are mounted to a top side of the fuselage and rotatable toward the front end from a retracted position aligned parallel with the fuselage to an extended position arranged at an angle relative to the fuselage, and the second wing bodies are rotatable relative to the first main wing bodies in a downward and outward direction relative to the fuselage;
wherein each of the second wing bodies is connected to one of the first wing bodies with a hinge joint, the hinge joints each comprising:
a lever arm;
a fulcrum positioned on the first wing body about which the lever arm pivots and wherein the lever arm slides within a groove formed in the first wing spar;
a pivot joint connecting the lever arm to the second wing body; and
at least one knob attached to one of the first wing spar or the second wing spar and configured to be coupled to the retention device to maintain the first wing and the second wing in a folded configuration.

2. The unmanned aerial vehicle of claim 1, wherein both of the first wing bodies are connected to the fuselage at a single pin joint.

3. The unmanned aerial vehicle of claim 1, wherein the hinge joint further comprises:
a tension element connected to the lever arm and positioned to exert an unfolding moment force to the second wing body.

4. The unmanned aerial vehicle of claim 1, further comprising:
a locking mechanism, the locking mechanism operable to lock the first wing body and the second main body in an operable condition.

5. The unmanned aerial vehicle of claim 4, wherein the locking mechanism further comprises:
the groove formed in the first wing spar;
a latch member formed in the second wing spar.

6. The unmanned aerial vehicle of claim 1, further comprising a folding tail pivotally connected to the fuselage at a canted hinge line relative to a longitudinal dimension of the fuselage, the tail being movable from a stowed orientation extending along a side of the fuselage to a deployed orientation extending at an angle to the longitudinal dimension.

7. The unmanned aerial vehicle of claim 1, wherein the canted hinge line is canted at a 45 degree angle to the longitudinal dimension.

8. The unmanned aerial vehicle of claim 1, wherein, for each of the first and second wings, a bottom side of the first wing body faces a bottom side of the second wing body when the wing is in a collapsed position.

9. A method of deploying an unmanned aerial vehicle (UAV), the method comprising:
providing a fuselage, a retention device attached to a rear end of the fuselage, and first and second wings, the first and second wings rotatably mounted to a top side of the fuselage, each wing including first and second wing bodies, wherein at least one of the first or second wings comprises a first wing spar and a second wing spar and at least one knob attached to one of the first wing spar or the second wing spar, and wherein each of the second wing bodies is connected to one of the first wing bodies with a hinge joint;
detaching the at least one knob from the retention device;
rotating the first and second wings from a retracted position in alignment with a longitudinal dimension of the fuselage in a forward direction and into an extended position arranged at an angle relative to the fuselage; and
rotating the second wing members in a downward direction relative to the first wing members and into alignment with the first wing members in a deployed position, wherein the hinge joint comprises a lever arm, a fulcrum positioned on the first wing body, and a pivot joint connecting the lever arm to the second wing body, and wherein rotating the second wing members in a downward direction relative to the first wing members comprises rotating the lever arm about the fulcrum and sliding the lever arm in the groove.

10. The method according to claim 9, further comprising:
providing a canister;
inserting the UAV in the canister;
deploying the UAV from the canister prior to rotating the first and second wings.

11. The method according to claim 10, further comprising:
providing the canister with inserted UAV in a free fall state;
slowing a descent of the canister with inserted UAV prior to deploying the UAV.

12. The method according to claim 11, wherein slowing the descent comprises deploying a drogue chute, the drogue chute being attached to an aft-end of the canister.

13. The method of claim 10, further comprising:
providing the canister with inserted UAV in a free fall state;
deploying stabilizing drag surfaces at an aft end of the canister prior to deploying the UAV.

14. The method of claim 10, further comprising:
opening a hatch proximate a fore-end of the canister;
wherein deploying the UAV from the canister includes deploying the UAV through the hatch.

15. The method of claim 10, further comprising:
after deploying the UAV from the canister:
deploying a propeller of the UAV;
releasing a lanyard connecting the UAV to the canister;
transitioning the UAV to flight.

16. An unmanned aerial vehicle comprising:
a fuselage;
first and second wings each comprising:
a first wing member mounted to a top side of the fuselage at a single connection point, the first wing member being rotatable in a forward direction between a first position arranged in alignment with a longitudinal dimension of the fuselage and a second position arranged at an angle relative to the fuselage;
a second wing member pivotally coupled to the first wing member with a hinge connection, the second wing member being rotatable between a stowed position below and overlapping with the first wing member, and a deployed position rotated downward and outward and into alignment with the first wing member, the first and second wings being movable using aerodynamic forces, wherein at least one of the first or second wings comprises a first wing spar and a second wing spar; and
a retention device attached to a rear end of the fuselage;
wherein the hinge connection comprises:
a lever arm;
a fulcrum positioned on the first wing body about which the lever arm pivots, and wherein the lever arm slides within a groove formed in the first wing spar;
a pivot joint connecting the lever arm to the second wing body; and
at least one knob attached to one of the first wing spar or the second wing spar and configured to be coupled to the retention device to maintain the first wing and the second wing in a folded configuration.

17. The unmanned aerial vehicle of claim 16, wherein the first wing member is pivotable about a first axis oriented in a first direction, and the second wing member is pivotable about a second axis that is perpendicular to the first axis.

18. The unmanned aerial vehicle of claim 16, wherein the second wing is positioned between the fuselage and the first wing when the first wing members are aligned with the longitudinal dimension of the fuselage.

19. The unmanned aerial vehicle of claim 16, further comprising a folding tail pivotally connected to the fuselage at a canted hinge line relative to the longitudinal dimension of the fuselage such that the tail is movable from a stowed orientation extending along a side of the fuselage to a deployed orientation extending at an angle relative to the longitudinal dimension of the fuselage.

\* \* \* \* \*